United States Patent
Ellens et al.

(10) Patent No.: US 8,780,108 B2
(45) Date of Patent: Jul. 15, 2014

(54) APPARATUS, SYSTEMS AND METHODS FOR SIMULATING A MATERIAL

(75) Inventors: Marc S. Ellens, Grand Rapids, MI (US); Francis Lamy, Wollerau (CH); Adrian Kohlbrenner, Thalwil (CH)

(73) Assignee: X-Rite Switzerland GmbH, Regensdorf (CH)

( * ) Notice: Subject to any disclaimer, the term of this patent is extended or adjusted under 35 U.S.C. 154(b) by 177 days.

(21) Appl. No.: 13/287,621

(22) Filed: Nov. 2, 2011

(65) Prior Publication Data

US 2013/0110482 A1    May 2, 2013

(51) Int. Cl.
*G06T 15/00*    (2011.01)

(52) U.S. Cl.
USPC ........... 345/419; 345/173; 345/633; 715/701; 715/702

(58) Field of Classification Search
USPC ........ 345/419, 173, 633; 703/6; 715/701, 702
See application file for complete search history.

(56) References Cited

U.S. PATENT DOCUMENTS

| | | | |
|---|---|---|---|
| 8,395,626 B2 * | 3/2013 | Millman | 345/473 |
| 2003/0208345 A1 * | 11/2003 | O'Neill et al. | 703/6 |
| 2009/0237420 A1 * | 9/2009 | Lawrenz | 345/649 |
| 2011/0261083 A1 * | 10/2011 | Wilson | 345/676 |
| 2012/0188279 A1 * | 7/2012 | Demaine | 345/633 |
| 2012/0314899 A1 * | 12/2012 | Cohen et al. | 382/103 |

OTHER PUBLICATIONS

Thomas Stumpp, "A Geometric Deformation Model for Stable Cloth Simulation", 2008, Computer Graphics, University of Freiburg, Germany, p. 1-8.*
Jeffrey M. Lane and Richard F. Riesenfeld, "A Theoretical Development for the Computer Generation and Display of Piecewise Polynomial Surfaces", IEEE vol. PAM1-2, No. 1 Jan. 1980, p. 35-45.*
Xavier Provot, "Deformation Constraints in a Mass-Spring Model to Describe Rigid Cloth Behavior", INRIA, Feb. 21, 2004, p. 1-8.*
Yue Peng Toh and Nancy Pollard, "Interactive Cloth Manipulation With Multi-Touch Control", Carnegie Mellon University, Stickfingers.pdf, Dec. 25, 2010, p. 1-9.*
Verlet, Computer "Experiments" on Classical Fluids. I. Thermodynamical Properties of Lennard-Jones Molecules, Physical Review, vol. 159, No. 1, 1967.

(Continued)

*Primary Examiner* — Maurice L McDowell, Jr.
(74) *Attorney, Agent, or Firm* — McCarter & English LLP

(57) ABSTRACT

Apparatus, systems and methods are provided for simulating a material. In particular, the disclosed apparatus, systems and methods involve modeling deformation characteristics of a material and generating a virtual representation of a physical interaction with the material based on the modeled deformation characteristics of the material and data representative of the physical interaction.

25 Claims, 7 Drawing Sheets

(56) References Cited

OTHER PUBLICATIONS

Lane, et al., A Theoretical Development for the Computer Generation and Display of Piecewise Polynomial Surfaces, IEEE Transactions on Pattern Analysis and Machine Intelligence, vol. Pami-2, No. 1, 1980.

Kawabata, Objective Specification of Fabric Quality, Mechanical Properties and Performance—The Development of the Objective Measurement of Fabric Handle, Department of Polymer Chemistry, Kyoto University, Kyoto, 606 Japan, 1982.

Baraff, et al., Large Steps in Cloth Simulation, in Proceedings of the 25th Annual Conference on Computer Graphics and Interactive Techniques (SIGGRAPH '98). ACM, New York, NY, USA, 43-54. 1998. DOI=10.1145/280814.280821 http://doi.acm.org/10.1145/280814.280814.280821.

Provot, Deformation Constraints in a Mass-Spring Model to Describe Rigid Cloth Behavior, Institut National de Recherche en Informatique et Automatique (INRIA), http://www-rocq.inria.fr/syntim/research/provot/, (1995).

Vassilev, Dressing Virtual People, Department of Computer Science, University College London, Gower Street, London WC1E 6BT, United Kingdom (2000).

Orzechowski, Interactive Mobile Presentation of Textiles, TextureLab, Heriot Watt University, Edinburgh, Scotland, MobileHC1-2010 Sep. 7-10, 2010, Lisboa, Portugal.

Pantone, Fashion+Home Color System, A SMART new system. Clariant, Data information sheet, one page, 2007.

Pantone Goe System, Introduction White Paper, http://www.mypantone, com, 2007.

\* cited by examiner (a) Length Preserving  (b) Angle Preserving

- ⋯▷ Force movement — Structural springs, first position
- → Constraint movement — Structural springs, final position Using uniform knots Using non-uniform knots a) Original mechanical grid   b) Fully refined grid   c) Triangle grid a) Single Touch Manipulation     b) Pinched Manipulation

APPARATUS, SYSTEMS AND METHODS FOR SIMULATING A MATERIAL

BACKGROUND

1. Technical Field

The present disclosure relates to apparatus, systems and methods for modeling deformation characteristics of a material. Moreover, the present disclosure relates to apparatus, systems and methods for generating a virtual representation of a physical interaction with the material. One potential application for the disclosed apparatus, systems and methods is in the field of mobile computing.

2. Background Art

Modeling characteristics of a material advantageously allows a user to analyze, e.g., visualize, a material, under a simulated set of conditions. The applications for such virtual material analysis are nearly endless, e.g., from facilitating selection of an appropriate material, to helping refine the aesthetics of a finished product. In modeling characteristics of a material, one goal is to minimize the disparity between a user interacting with a virtual material and a user interacting with a physical material. One of the greatest areas of disparity is the inability of a user to physically touch or manipulate a virtual material. Thus, improved apparatus, systems and methods are needed to simulate a physical interaction with a virtual material, e.g., to enable a user to analyze deformation characteristics such as tensile strength and elasticity.

There has in recent years been an explosion of mobile computing devices, such as tablets, laptops, smartphones, personal digital assistants, etc. Mobile computing devices are attractive to users, e.g., due to their portability and accessibility. Moreover, mobile computing devices have been at the forefront of pushing the limits of environmental/human interaction. For example, a typical mobile computing device may include a wide array of detectors/sensors for interacting with a user and/or the environment, including but not limited to detectors/sensors for imaging (e.g., a camera), ambient light, orientation/motion (e.g., a gyroscope), tactile interaction (e.g., a touchscreen), temperature-based functionality, location-based functionality (e.g., GPS), radio frequency communications, etc. Moreover, a typical mobile computing device may include or interface with a wide array of mechanisms for providing feedback, including but not limited to visual (e.g., a display), auditory (e.g., a speaker), and/or tactile (e.g., a haptic interface) interfaces.

Given the plethora of abilities and functionalities, mobile computing devices advantageously provide a platform ripe with opportunity for improving upon conventional material simulation. In particular, since most mobile computing devices support tactile interaction (e.g., via multi-touch touchscreen interfaces), there is a need and/or opportunity for improved material simulation which utilizes, at least in part, such tactile interaction functionality.

The foregoing needs/opportunities and other needs/opportunities are addressed by the apparatus, systems and methods of the present disclosure.

SUMMARY

Advantageous apparatus, systems and methods are provided for modeling deformation characteristics of a material and/or for generating a virtual representation of a physical interaction with the material, e.g., based on the modeled deformation characteristics of the material and data, e.g., inputted or selected data, representative of the physical interaction. In exemplary embodiments, a processor may be used to implement modeling of the deformation characteristics of the material and/or generating of the virtual representation of the physical interaction with the material. Thus, the processor may be operatively associated with a non-transitory processable medium, including executable instructions that are effective to model the deformation characteristics of the material and/or generate the virtual representation of the physical interaction with the material.

In exemplary embodiments, a tactile sensor, e.g., operatively associated with the processor, may be used to receive, as user input, data representative of the physical interaction. In some embodiments, the tactile sensor may include multi-touch capabilities for simulating a physical interaction with multiple touch points. In exemplary embodiments, a display, e.g., operatively associated with the processor, may be used to display the virtual representation of the physical interaction with the material.

An important consideration or factor for a realistic user experience is real-time (or near real-time) material simulation. Thus, in exemplary embodiments, the physical interaction with the material may be simulated in real-time (or near real-time) on the display. In some embodiments, the display and tactile sensor may be a touchscreen interface. Thus, in exemplary embodiments, a user may input data representative of the physical interaction by interacting with a displayed virtual representation of the material.

Additional features, functions and benefits of the disclosed apparatus, systems and methods will be apparent from the description which follows, particularly when read in conjunction with the appended figures.

BRIEF DESCRIPTION OF THE DRAWINGS

To assist those of ordinary skill in the art in making and using the disclosed apparatus, systems and methods, reference is made to the appended figures, wherein.

DESCRIPTION OF EXEMPLARY EMBODIMENT(S)

Advantageous apparatus, systems and methods are provided for modeling deformation characteristics of a material and/or for generating a virtual representation of a physical interaction with the material, e.g., based on the modeled deformation characteristics of the material and data, e.g., inputted or selected data, representative of the physical interaction.

Figure 1:
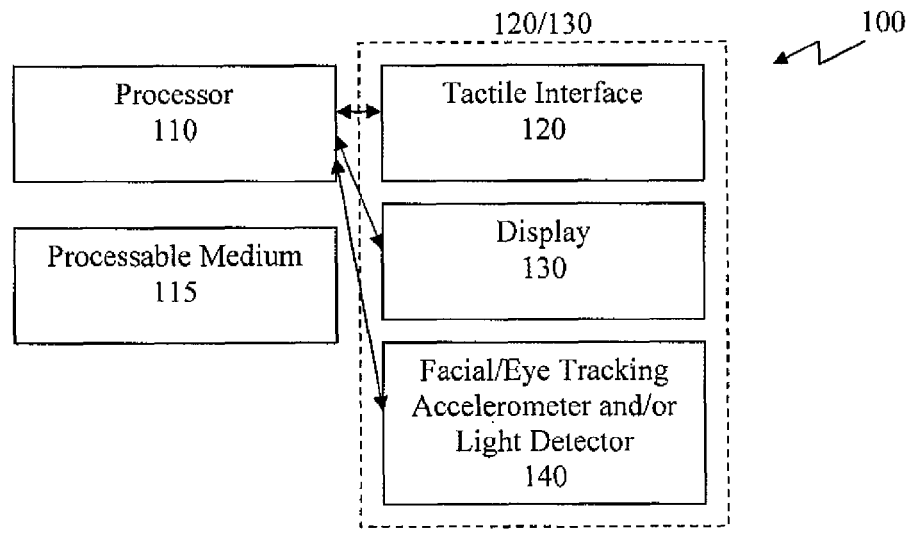
FIG. 1 depicts an exemplary simulation system according to the present disclosure.

With initial reference to FIG. 1, an exemplary simulation system 100 is depicted according to the present disclosure. The simulation system 100 may include a processor 110. The processor 110 may be operatively associated with a non-transitory processable medium 115, including executable instructions that are effective to model the deformation characteristics of a material and/or generate a virtual representation of a physical interaction with the material. A tactile sensor 120 operatively associated with the processor 110 may be used to receive, as user input, data representative of the physical interaction. In some embodiments, the tactile sensor 120 may include multi-touch capabilities for simulating physical interaction with multiple touch points. A display 130 may also be operatively associated with the processor 110 and may used to display the virtual representation of the physical interaction with the material.

An important consideration or factor for a realistic user experience is real-time material simulation (note that real-time as used herein encompasses near real-time). Thus, in exemplary embodiments, the physical interaction with the material may be simulated in real-time (or near real-time) on the display 130. In some embodiments, the display 130 and tactile sensor 120 may be a touchscreen interface 120/130. Thus, in exemplary embodiments, a user may input the data representative of the physical interaction by interacting with a displayed virtual representation of the material. In exemplary embodiments, simulation system 100 may further include one or more of (i) an eye/facial detector, (ii) an orientation sensor and (iii) a light detector (collectively, 140), as further described herein.

Figure 2:
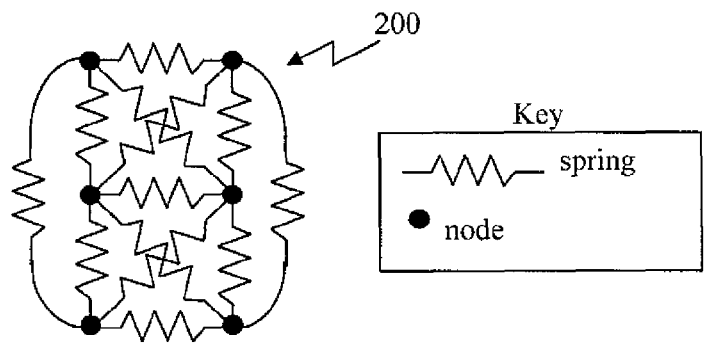
FIG. 2 depicts an exemplary iterative spring-mass model for modeling deformation characteristics of a material according to the present disclosure.

In exemplary embodiments, the deformation characteristics of the material may be modeled based on an iterative spring-mass model such as depicted in FIG. 2. As depicted in FIG. 2, the deformation characteristics of the material may be modeled using a network 200 of dimensionless mass elements (also referred to as nodes) connected relative to each other in a grid via a set of springs. The network 200 may include distance-preserving springs (also referred to as structural springs) between each adjacent node in columns and rows. In general, structural springs may not be enough to provide good degree of physical realism to the network 200. Thus, as depicted in FIG. 2, the network 200 may be enhanced to include shearing springs between diagonal nodes and/or bending springs between alternating nodes. The shearing springs may advantageously be used to prevent/control uncontrolled shear deformation and the bending springs may prevent/control folding of the material. In some embodiments (not depicted), the network 200 may also be enhanced to include flexional springs which may be used to limit/control the angle between springs on a particular node.

In exemplary embodiments, $p_{ij}(t)$, $v_{ij}(t)$, and $a_{ij}(t)$ may represent the position, velocity and acceleration vectors at a given node, (i,j) and at a given time t. Thus, the mathematical underpinnings of the network 200 may be derived from Newton's second law:

$$f_{ij} = m a_{ij}$$

where m is the mass at each point, and $f_{ij}$ is the sum of forces applied at $p_{ij}$.

In exemplary embodiments, the primary forces applied at each node are from the tension of the springs. This tension is produced by the deformation of the spring according to Hooke's Law. Thus, the internal force that is produced on the node may be computed according to the following equation:

$$f(p_{i,j}) = -\sum_{kl} k_{ijkl} \left[ \overrightarrow{p_{kl} p_{ij}} - l^0_{ijkl} \frac{\overrightarrow{p_{kl} p_{ij}}}{|\overrightarrow{p_{kl} p_{ij}}|} \right],$$

where $l_{ijkl}^D$ denotes the natural length or rest length of the spring linking $p_{ij}$ and $p_{kl}$ and $k_{ijkl}$ is the stiffness.

It is noted that characteristics of the network 200, such as the natural length and stiffness of each spring may be selected so as to best model real-world deformation characteristics, such as tensile strength, shear strength and elasticity of the material being modeled. Internal forces may be supplemented by external forces such as gravity, wind and other constraint-derived forces. In exemplary embodiments, the network 200 may be used to simulate deformation characteristics of a material taking into account a constraint surface (e.g., to simulate the material laying on or mounted to a surface). Thus, in some embodiments, external forces may include a very small buckling force to prevent/mitigate instability arising from an application of compression forces and encourage the material to buckle away from the constraint surface.

Once the external and internal forces are established, a set of simple Euler equations may be used to model the movement of the nodes:

$$a_{ij}(t + \Delta t) = \frac{1}{m} f_{ij}(t)$$

$$v_{ij}(t + \Delta t) = v_{ij}(t) + a_{ij}(t + \Delta t)\Delta t$$

$$p_{ij}(t + \Delta t) = p_{ij}(t) + v_{ij}(t + \Delta t)\Delta t$$

This system of equations may be solved at each time step to produce a system that is at rest. Both explicit and implicit solution methods may be used and, in many cases, the intermediate steps in the solution are of interest. Provot (1995) and Vassilev (2000) have proposed empirical solutions. Standard Euler, Runga-Kutta may be used as well. Implicit methods include those proposed by Baraff and Witkin (1998) and Kawabata (1982).

One simplified solution is known as Verlet integration. Verlet integration has its origins in molecular dynamics. It is extremely stable and very fast. Instead of storing each node's position and velocity, apparatus, systems and methods utilizing Verlet integration store each node's current position, $p_{ij}$, and previous position, $p_{ij}^-$. The time step may be fixed such that the next position, $p_{ij}^+$, is defined by $$p_{ij}^+ = 2p_{ij} - p_{ij}^- + a_{ij}(t)\Delta t^2$$

after which $p_{ij}^- = p_{ij}^+$ (i.e., the previous position is set to the current position).

In exemplary embodiments, $2x-x^-=x+(x-x^-)$, where $(x-x^-)$ is an approximation of the current velocity (thus, demonstrating a relationship to the Euler equations). It is noted that, in some embodiments, the factor of 2 may be reduced slightly to simulate drag.

By using Verlet integration, integration of constraints is simple and straightforward. In exemplary embodiments, springs may be treated as constraints instead of force generators (note that making spring stiffness large to simulate a rigged material would require extremely small time steps or produce instability which is not suitable for an interactive system). Thus, in exemplary embodiments, the forces requiring consideration may advantageously be reduced (e.g., to: gravity and the small buckling force). In addition, surface/ground plan constraints (which, for speed, may be implemented separately from other collision detection), movement constraints, attachment constraints, self-collision, and "finger" collision constraints may also be rapidly and easily considered using Verlet integration. Constraint resolution feeds directly into Verlet integration by modifying the positions of the nodes to satisfy the constraint. In doing so, the velocity for the next step is affected directly instead of requiring recalculation and/or compensation.

In practice, two types of constraints may be considered: external constraints and spring constraints. External constraints may be either fixed or planar. Spring constraints may be differentiated by the spring type (structural, shear or bending).

In exemplary embodiments, a fixed constraint may represent a point of attachment, e.g., of a virtual material to an edge of the display (so as to prevent the user from moving the virtual material out of view). In this case, the fixed point is then does not change during iteration.

$$p_{ij}^+ = p_{ij}$$

A node may also be considered fixed when it is being manipulated by an external interaction, e.g., such as represented by a point of contact of a user's finger on a tactile interface. In this case, however, the node is fixed only in the sense that the solution system is not allowed to move it. Thus, the node's movement may be governed by the external interaction:

$$p_{ij}^+(t) = g_{ij}(t),$$

where $g_{ij}(t)$ is a position for the node generated as part of a gesture at the given time.

One exemplary simulation environment contemplated using the apparatus, systems and methods disclosed herein is a virtual Pantone™ Textile standard card (X-Rite, Inc.; Grand Rapids, Mich.). In a Pantone™ Textile card, the material, e.g., a fabric, is attached along the top of a white card backing which causes the material to lie flat. In exemplary embodiments, a virtual card backing may be implemented using a planar constraint. In this case, nodes may be prevented from crossing the plane by a simple condition evaluation. The constraint may be directional and, in general, may be implemented opposite gravity. For example, where gravity is specified in the negative direction along the Z-axis, all that is required for a planar constraint is a check on the Z-axis component:

$$p_{ij}^+(t) \cdot z = \max(p_{ij}^+(t) \cdot z, c),$$

where $p_{ij}^-(t)$ is the intermediate node location, which is the initially computed next location of $p_{ij}(t)$, and c is the z value of the plane.

As noted above, Verlet integration caters to treating springs as constraints rather than treating springs as force generators (which impart momentum to the material). Consider a structural spring where the ideal (or rest) length of a spring is known. Initially, the nodes are moved in response to the external forces acting upon them (or moved by fixed interaction constraints). Rather than consider the force generated by the spring, the spring may be treated as moving the two nodes, $p_{ij}$ and $p_{kl}$, to conform to the spring's ideal length. Thus, e.g., if one of the nodes is fixed, all movement may be applied to the free node. Movement may be applied in the axis of the spring, which, in exemplary embodiments, may be defined as the vector between the two intermediate node locations.

In exemplary embodiments, structural springs may correct node positions according to the following functions:

$$p_{ij}^+ = p_{ij}^- + \frac{1}{2}\left[1 - \frac{l_{ijkl}^o}{|\overrightarrow{p_{kl}^- p_{ij}^-}|}\right]\overrightarrow{p_{kl}^- p_{ij}^-}$$

$$p_{kl}^+ = p_{kl}^- - \frac{1}{2}\left[1 - \frac{l_{ijkl}^o}{|\overrightarrow{p_{kl}^- p_{ij}^-}|}\right]\overrightarrow{p_{kl}^- p_{ij}^-}$$

Figure 3:
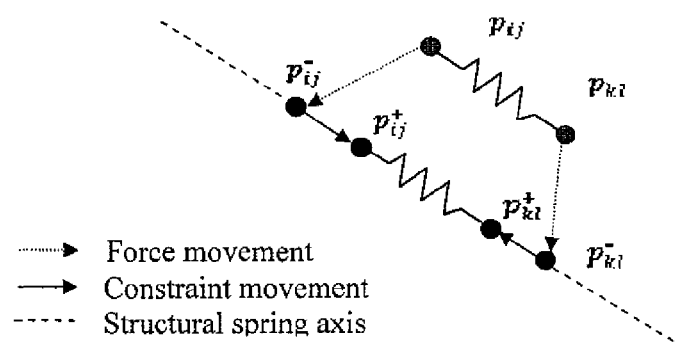
FIG. 3 depicts correcting node positions for an exemplary structural spring treated as a constraint.

Note that the above equations are symmetric, essentially splitting the difference between new spring length and rest length along the spring's axis, e.g., wherein half the difference is added (or subtracted if negative) from each corresponding node. See, e.g., FIG. 3. In other embodiments, the equations may be asymmetric. Shear springs may be treated similar to structural springs.

While it is also possible to address bending springs in a similar fashion, the simple implementation of maintaining distance may cause problems. In exemplary embodiments, springs are evaluated in a consistent sequence and even though some points get moved multiple times (possibly in different directions), the system stabilizes very rapidly. Thus, if bending springs are implemented in a length preserving manner, when the material is bent (e.g., by a user's external interaction), the bending springs cause elongation of the structural springs (i.e., bending springs push nodes apart without regard to the bend). See, e.g., FIG. 4a.

In exemplary embodiments, structural springs are evaluated first, then shear, then bending. Thus, permitting bending springs to modify calculated stable states for the structural and shear springs may result in system instability. Furthermore, bending is typically more acceptable than stretching. Thus, bending springs are usually not rigid.

Figure 4:
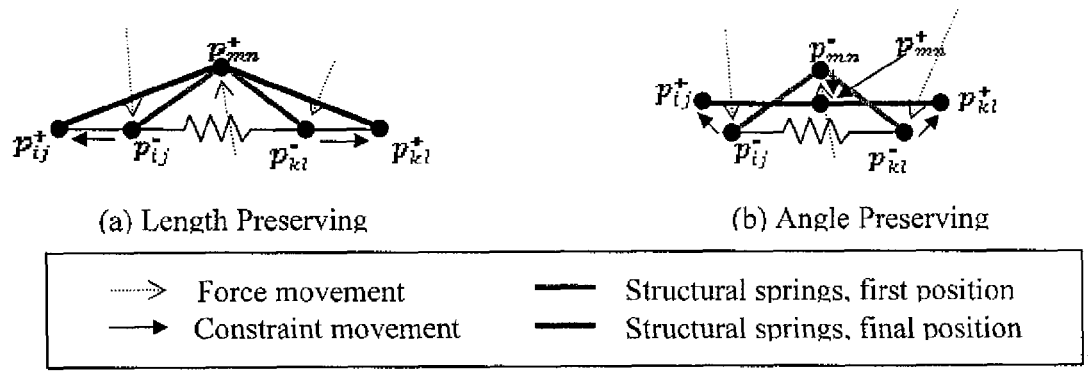
FIG. 4 depicts correcting node positions for an exemplary bending spring treated as a constraint using (a) length preservation, and (b) angle preservation techniques, respectively, according to the present disclosure.

In exemplary embodiments, such as depicted in FIG. 4b, bending springs may function to preserve an angle between adjacent structural springs. As depicted in FIG. 4b, a bending spring may be attached to $p_{ij}$ and $p_{kl}$, wherein $p_{mn}$ is the in between node. $\tau_{mn}$ may be defined as the projection of $\overrightarrow{p_{mn}^-}$ onto the vector $\overrightarrow{p_{kl}^- p_{ij}^-}$:

$$r_{mn} = \left[\overrightarrow{p_{mn}^- p_{ij}^-} - \frac{\overrightarrow{p_{kl}^- p_{ij}^-}}{|\overrightarrow{p_{kl}^- p_{ij}^-}|}\right]\overrightarrow{p_{kl}^- p_{ij}^-} + p_{ij}^-$$

An offset n may than be defined as follows:

$$n = |\overrightarrow{p_{mn}^- \tau_{mn}}|(\overrightarrow{p_{mn}^- \tau_{mn}})$$

Note that the length of n is the square of the original projection vector. This provides some automatic reduction of the influence of this constraint, thereby allowing the cloth to bend. This factor controls the stiffness of the material.

Using the above model, the new points are:

$$p_{ij}^+ = p_{ij}^- + \frac{n}{2}$$

$$p_{kl}^+ = p_{kl}^- + \frac{n}{2}$$

$$p_{mn}^+ = p_{mn}^- - \frac{n}{2}$$

If neither $p_{ij}$ or $p_{kl}$ are fixed, then half or some other proportion of the offset may be applied to each outside node. If either $p_{ij}$ or $p_{kl}$ are fixed, then all the offset may be applied to the non-fixed node. If $p_{mn}$ if fixed, then all the offset is applied to both outside nodes. Finally, if both outside nodes are fixed, all the offset may be applied to $p_{mn}$.

Although the iterative mass spring models presented herein are intentionally simple, collision detection and resolution may be required for a realistic interactive experience. In exemplary embodiments, at least two collision types may be advantageously addressed: collision with ellipsoids and self-intersection. Note that collisions with planes may be handled as planar constraints.

Figure 5:
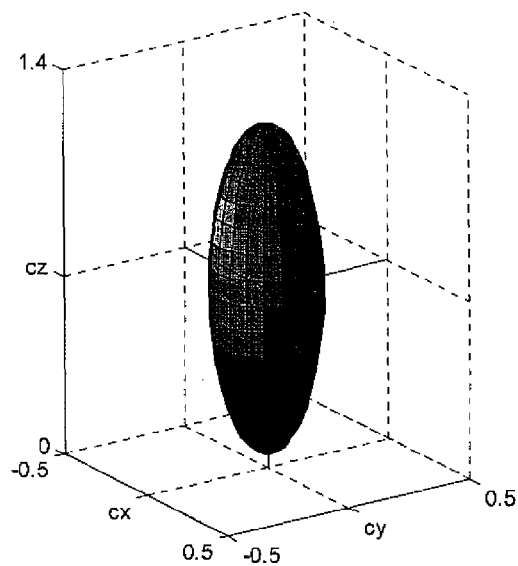
FIG. 5 depicts an exemplary ellipsoid according to the present disclosure.

One advantage of ellipsoidal collision detection is that the collision is handled analytically. Parameters are provided for the ellipsoid by defining a center tuple, $c_{[x,y,z]}$, three angles of rotation, $r_{[\theta,\phi,\gamma]}$, and three scaling factors, $s_{[x,y,z]}$. A sphere is then transformed using these parameters into a generalized ellipsoid (see, e.g., the ellipsoid of FIG. 5). In practice, it may be easier to use the parameters to transform points in question to a spherical space and then project outside of a sphere rather than to perform a projection on an ellipse.

Figure 6:
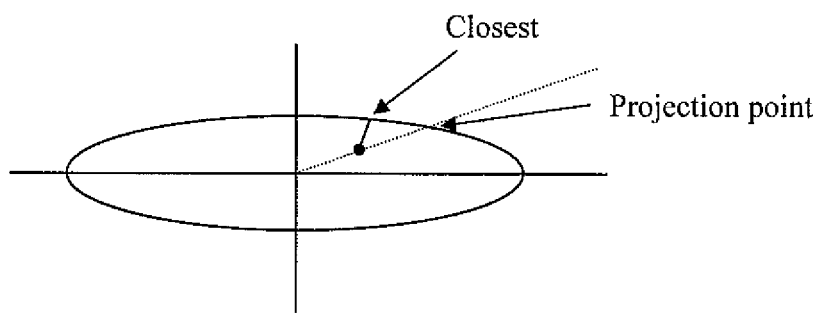
FIG. 6 demonstrates the difference between a radial projection and a closest exterior point for an exemplary ellipse, according to the present disclosure.

The crux of ellipsoidal collision detection is that there may be a difference between a radial projection and a closest exterior point for an ellipse (see, e.g., FIG. 6). This is an issue for large eccentricities and large penetrations. For small penetrations, this difference is negligible and, for larger penetrations, subsequent steps may be used to correct the issue. In general, eccentricity is as shown in finger tip interactions, wherein one direction is longer than the other two (since user interactions involve finger tips, the ellipsoid shape is appropriate).

As the user interacts with the virtual material using a tactile interface, the material is constrained to move with the touch. The simplest implementation involves fixing the finger nodes relative to the network of the virtual material. In this case, several nodes need to be fixed to handle orientation issues. If these nodes are too far apart, then unnatural deformations occur in the material away from the finger. If they are unevenly spaced, once again artifacts occur. One solution is to increase the density of nodes in the system. This, however, may also negatively impact performance.

Figure 7:
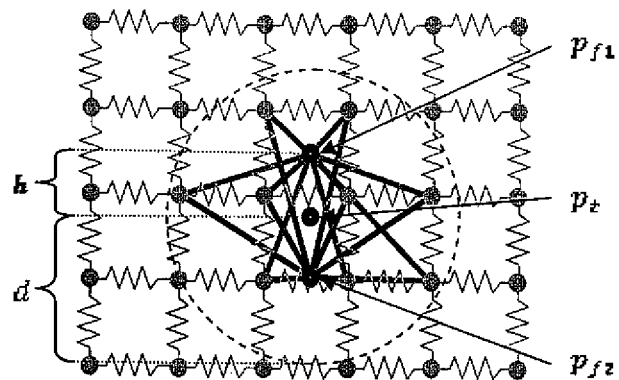
FIG. 7 depicts modeling an exemplary finger-tip interaction according to the present disclosure.

Another solution advantageously keeps the node density low while enabling natural interaction with little to no artifacts. This solution involves representing the finger tip as an elongated ellipse for collision detection. The finger tip may always be vertically oriented and slightly above the material surface to avoid conflict with the planar constraint. This interaction may be implemented via a set of the previously defined constraints. Since the user can touch the material at any point, it will not necessarily be at a singular node (in fact, rarely). As depicted in FIG. 7, two fixed finger nodes, $p_{f1}$ and $p_{f2}$, may be created near a touch point, horizontally spaced some small delta, $\phi$, away from an actual touch point, $p_t$. These nodes track with the finger position as the user interacts with the system. New structural springs may also be created for all nodes within a certain distance d away from the touch point.

As the user interacts with the system, the finger nodes may be moved, causing the material to move along with the finger(s). Since there are at least two points associated with the finger, the orientation of the material under the finger stays somewhat fixed relative to the orientation of the finger (note that, in some embodiments, the orientation may be configured to move slightly if enough torsional force is exerted on the material by the movement).

Handling self-intersection is often the most difficult and expensive aspect of material simulation. Unfortunately, since materials such as fabrics and cloth are thin and easily deformed/folded, accounting for self-intersection may be very important for preserving realism. The brute force collision detection is an $O(n^2)$ problem. The material is triangulated along the nodes of the rows and columns. Every triangle must then be compared with every other triangle to determine whether there is an intersection. Even if there is no intersection, it needs to be determined if the triangle is on the wrong side of the cloth and should be moved to the other side.

There are several techniques available to make this process more efficient. First, a fast partitioning structure—called an axis-aligned bounding box tree (AABB tree)—may be utilized. This structure is simple and easy to maintain. Other possible implementations include oriented bounding box trees (OBB) and quad-trees. The AABB tree is $O(\log(n))$ to update and $O(n \log(n))$ to evaluate. In addition, assumptions may be made about proximity to avoid checking vertices that are known not to intersect. In particular, triangles, e.g., with vertices within two rows or columns of each other may be skipped, where it is known that the spring constraints prevent them from intersecting. However, these triangles may need to be included in the tree for other intersections.

Once triangles are identified as potential intersections, a standard triangle-triangle intersection routine may be used to determine the type of intersection and provide information for how to correct the intersection. The most common correction algorithms use repelling forces surrounding the material to push the vertex back to the right side. There may be issues with this method: e.g., triangles that are not intersections but which have completely moved to the other side of the cloth will resist moving back; also, depending on the implementation, if the force is insufficient to move the node far enough to prevent the intersection, it is possible that the triangle will be content to be intersected and no longer be tested.

In exemplary embodiments, potential bounding box collisions are identified, but triangle intersection/correction is not performed for speed reasons. This may be acceptable due to material rigidity and the spring constraints limiting the possible self-intersections. In experimental implementations, only occasional artifacts were observed using this technique.

Figure 8:
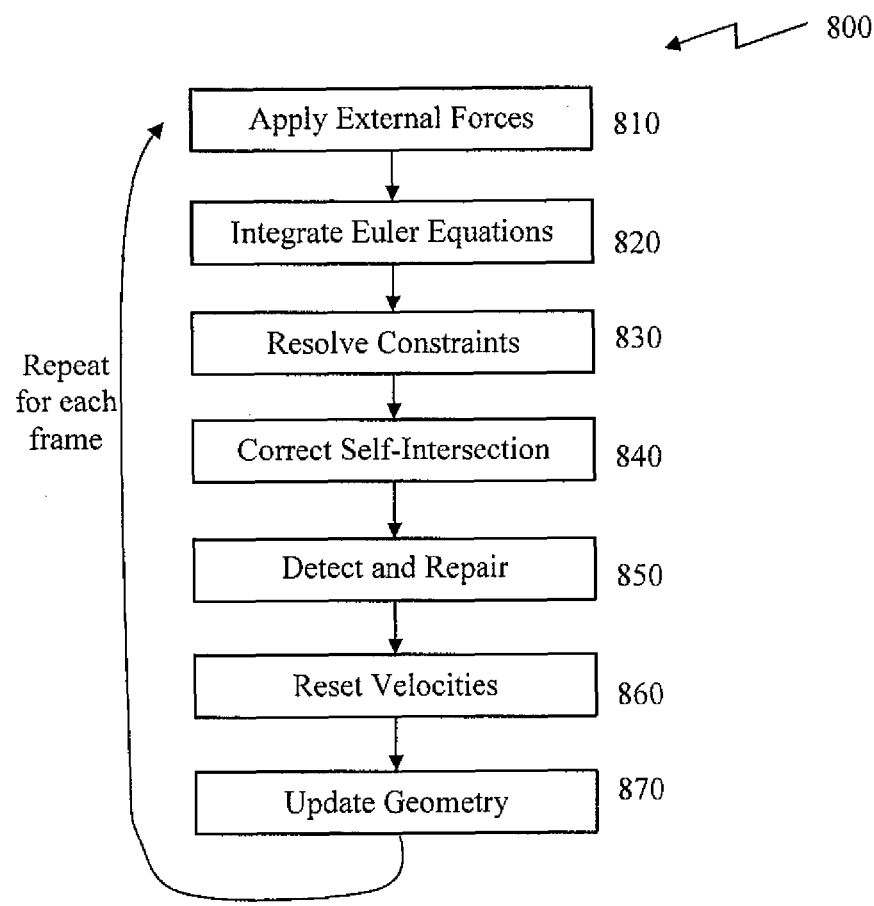
FIG. 8 depicts an exemplary iterative process for material simulation according to the present disclosure.

The various elements of simulation listed above may be part of an iterative process, e.g., triggered by the frame-rate of the interaction. As depicted in FIG. 8, an exemplary iterative process 800 may include applying external forces (e.g., via user interaction with a tactile interface) 810, integrating the Euler equations 820, and resolving constraints 830 (e.g., using Verlet integration), correcting self-intersection 840 and detecting/repairing collisions 850 (e.g., to remove/mitigate artifacts), resetting velocities 860 (e.g., for the next iteration), and updating geometry 870 (e.g., for display purposes as well as the next iteration).

As noted above, a network of springs and nodes may provide the mechanics behind material simulation according to the present disclosure. Visualization of the virtual material requires associated geometry that is compatible with a virtual display. Usually, the lattice of nodes doubles as a lattice of vertices in a triangular mesh. Unfortunately, as the number of nodes increases, the performance of the material mechanics decreases. However, if there are too few nodes in the geometry, the triangles in the mesh are clearly visible, causing a distraction. The challenge is therefore to keep mechanics fast while not showing visible artifacts.

Figure 9:
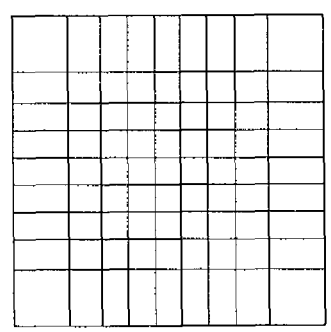
FIG. 9 depicts exemplary spring networks using (a) uniform, and (b) non-uniform knots, respectively, according to the present disclosure.
Figure 9:
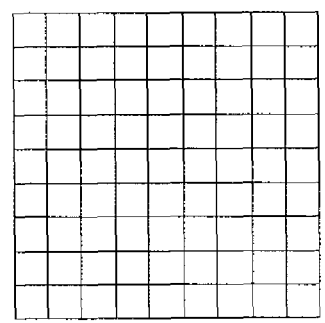
Figure 10:
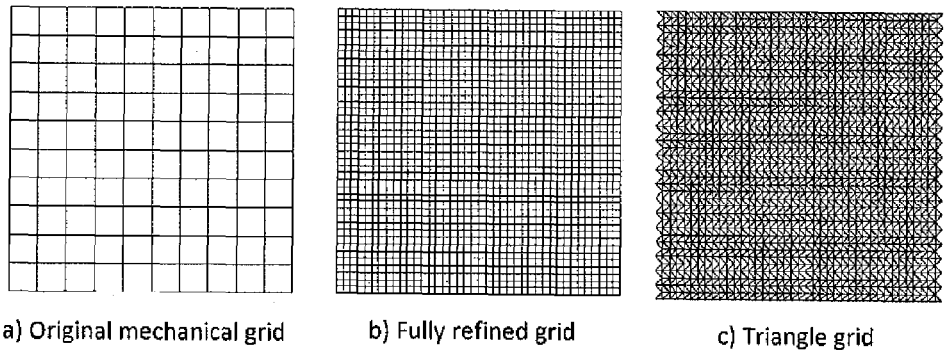
FIG. 10 depicts an exemplary grid for a virtual material (a), a refined grid derived from the exemplary grid (b), and a triangular mesh corresponding to the refined grid (c), according to the present disclosure.

One solution is to have the nodes of the spring mesh correspond to control points of a B-spline surface. The vertices of the mesh may be a linear combination of the control points based on the B-spline basis functions through a process known as refinement [Lane 1980]. Typically, a uniform knot arrangement produces points that are elongated near the end of the surface (see, e.g., FIG. 9a). In order to produce a mesh that has uniformly sized triangles, non-uniform knots are used (see FIG. 9b). The knot positions may be determined by binary search for simplicity and flexibility, although careful analysis of the equations may be used to produce a closed form solution for any given lattice configuration. In exemplary embodiments, a fourth order ($C^3$) tensor product B-spline may be used so that the surface is continuous in its curvature in both directions. The lattice may be divided into triangle strips which can be effectively used by the OpenGL graphics engine (and are applicable to other standard graphics engines such as DirectX). Since the mechanics and the geometry are independent, the level of refinement may be optimized for the resolution of the display and/or speed of the graphics card. For some mobile devices, an initial grid of 11×11 points may be refined to 41×41 points (see, e.g., FIG. 10).

Figure 11:
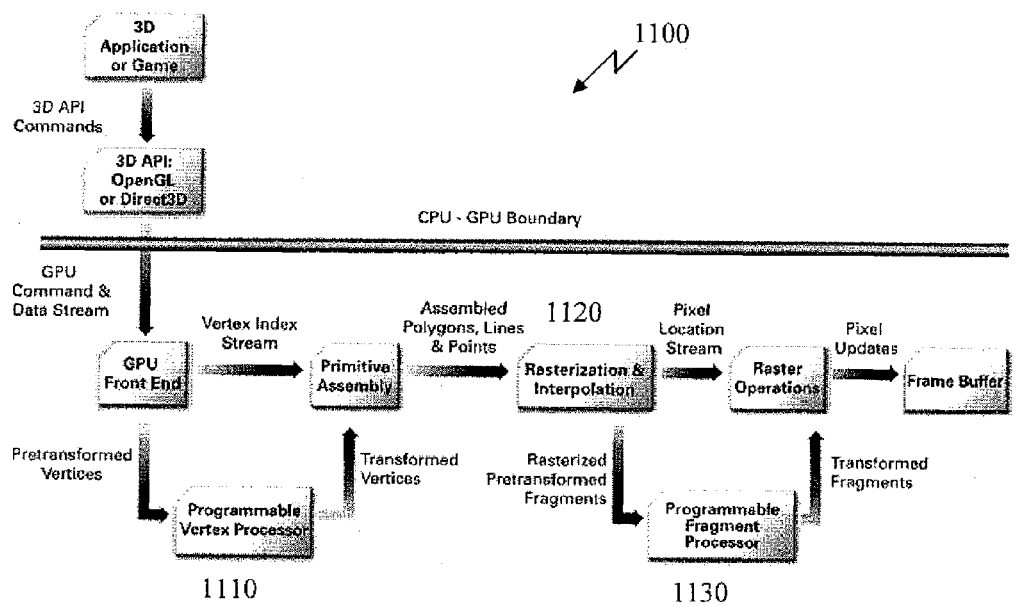
FIG. 11 depicts an exemplary rendering process according to the present disclosure.

Another aspect of the simulation experience relates to the appearance of the material. In practice, the triangle mesh may be sent to the graphics engine where lighting information for each pixel is determined. An exemplary rendering process 1100 is depicted in FIG. 11. In general, hardware components of mobile rendering platforms behave very similarly to those on desktops. The greatest differences are in the variety of API calls that are provided and the speed at which the rendering takes place. After geometry is sent to the graphics engine, the graphics engine's processing of the pixels may be customized via programmable vertex 1110 and fragment 1130 processors. Implementation of a programmable vertex processor 1110, or vertex shader, is fairly straightforward. Its main function is to transform the pixel coordinates, normal, tangent, bi-normal, view, light and eye vectors, to screen space. These values then are interpolated in the rasterization and interpolation phase 1120 and sent to the programmable fragment processor 1130, or pixel shader. The pixel shader implements the look of the material. The material will have a look depending on the type of material that is being simulated. For example, the look may be generated from a combination of one or more of the following elements:

1) bidirectional texture function (BTF)
2) bidirectional reflectance distribution function (BRDF)
3) texture
4) diffuse color
5) specular color
6) normal map
7) random noise map The above elements may be selected according to the available data and/or the ability of the visual model to represent reality. Several exemplary prototypes for virtual materials have been developed/tested.

The first exemplary prototype based on a simple Pantone™ cotton weave used in the Pantone™ Textile Standards set produced by X-Rite, Inc. (Grand Rapids, Mich.). The material is a very tight weave, approx. 75 threads-per-inch and very uniform in color and texture. Sample preparation typically includes stretching and steaming the fabric to remove any visible wrinkles. The fabric sample is folded and mounted on the top of the card with the side edges pinked. The simulation may imitate this fabric presentation, e.g., by attaching the virtual fabric to a "top" of the display using fixed constraints (specifically, two rows may be fixed so that the fabric resists bending where it is attached). The virtual material may be presented with pinked "side" edges.

The rendering of the fabric in such prototype system is fairly simple. Each pixel determines the diffuse lighting from the environment using a standard diffuse Lambertian response to a lighting direction, then multiplies that by the albedo color of the cloth (provided through measurements and selected by the user) which is further multiplied by a texture map which provides the fiber weave variation. The fiber texture is balanced at 50% grey and modulates the color with a net 0 integral so that it does not modify the overall perceptual color value.

A second, more advanced prototype has also been developed which uses data obtained through RIT's Munsell Color Lab. The data may include a texture map of surface normals and a set of parameters for driving a BRDF model, known as the Ward model. In this variety, the Lambertian and specular lobe responses may be integrated into the Ward parameters. The normal of the surface at a particular point may be determined by accessing a location in the normal map. The Ward parameters nay then determine the effect of the diffuse plus the specular lobe. The resulting color may again be modulated by the texture map. Alternatively, the texture map may be omitted where the normal map provides shading. In some embodiments, the texture map may determine the albedos for the Ward model instead of a modulation type of texture map. Using the second prototype, several different phenomenological BRDF models were implemented and investigated for performance and look/feel with good results.

A third prototype implementation according to the present disclosure would involve a generic BTF on a mobile device. In exemplary embodiments, this implementation would utilize a compressed BTF format, e.g., such as developed at the University of Bonn (the University of Bonn format has been implemented into various real-time and off-line graphics engines and applicants are investigating using it for mobile devices).

Interaction also plays an important role in the material simulation experience. In exemplary embodiments, interaction makes use of two types of hardware, a tactile interface, e.g., a touch capable screen, and one or more orientation sensors, e.g., integrated accelerometers. Interacting with a piece of material in reality usually involves handling the material. In addition to the visual cues of color and texture, the mechanical folding of the fabric, its feel, and its weight are all elements that combine to provide the user with a full sense of the material. Unfortunately, the feel and weight of the fabric are not easily conveyed using a display. Color, texture and mechanics, however, can be visualized.

Figure 12:
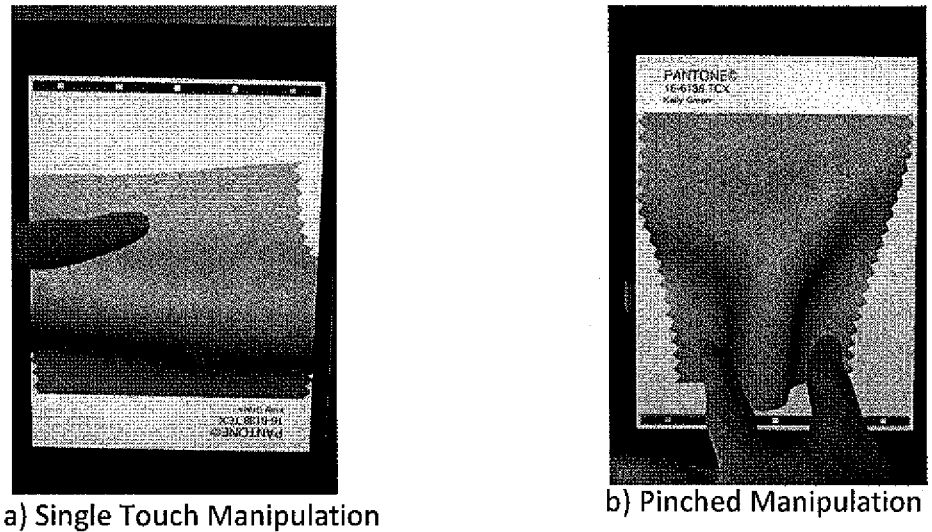
FIG. 12 depicts exemplary user interactions with a simulated material according to the present disclosure.

To manipulate the fabric, a user touches the tactile interface, e.g., touches the touch capable screen based on a displayed image of a material. When the user drags across the tactile interface, the fabric tracks with the touch, maintaining its original orientation relative to the screen. Since, in exemplary embodiments, the material is attached at a "top" end of the display (similar to the way the fabric is mounted on the Pantone™ Textile standard card) and the material deforms according to the mechanics dictated by such constraints, simulating the way the material folds when moved (see FIG. 12a). In exemplary embodiments, the user may use several fingers (one implementation allows 5, but practically, only 2 or 3 fingers are useful) to manipulate the material, e.g., pinch the material, causing it to fold between the fingers in real time (see FIG. 12b). This type of interaction is extremely convincing and conveys significant information about the material properties to the user. By changing bending weights, e.g., based on a material's physical properties/characteristics, the flexibility of the material may be controlled. In exemplary embodiments, a user's interaction with a touch screen can simultaneously manipulate a plurality of displayed virtual materials, e.g., to facilitate comparison therebetween.

Figure 13:
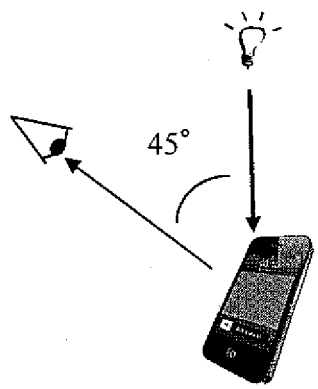
FIG. 13 depicts an exemplary configuration for a user viewing a simulated material according to the present disclosure.

In exemplary embodiments, the color and look of a virtual material may be influenced heavily by a primary lighting direction. For materials such as fabrics which are diffuse (or more specifically, non-reflective), the overall environment in which they are viewed is less critical. In some embodiments, the primary lighting direction may be assumed to be straight above the device. In other embodiments, a detector may be used to determine the primary lighting direction. In some embodiments, the user may be assumed to be looking at the device at a 45 degree angle relative to the light (see FIG. 13). An accelerometer may provide an orientation of the device, e.g., relative to the light. Thus, the user's view angle relative to the light source may be calculated based on device orientation. For example, in some embodiments, it may be assumed that the user is viewing the device at a fixed angle relative to the display plane, e.g., normal to the display plane. In other embodiments, eye/facial tracking, e.g., using a front facing (relative to the screen) camera, may be used to obtain the user's view angle relative to the display plane. GPS and time data may also be integrated to provide data on a moving light source, such as the sun. Using the above techniques, real-time information about the relative lighting direction may be provided for rendering the material appropriately. Lighting is important to the color and shading of a material as it bends/folds.

It is explicitly contemplated that the apparatus, systems and methods presented herein may include one or more programmable processing units having associated therewith executable instructions held on one or more computer readable medium, RAM, ROM, hard drive, and/or hardware. In exemplary embodiments, the hardware, firmware and/or executable code may be provided, e.g., as upgrade module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey processed data, e.g., to display a virtual fabric. The display and/or other feedback means may be stand-alone or may be included as one or more components/modules of the processing unit(s). In exemplary embodiments, the display and/or other feedback means may be used to facilitate a user interacting with a displayed virtual material via a tactile interface. In some embodiments the display and/or other feedback means includes a touchscreen, which functions as both a display and a tactile interface. The tactile interface may have multi-touch capabilities.

The actual software code or control hardware which may be used to implement some of the present embodiments is not intended to limit the scope of such embodiments. E.g., certain aspects of the embodiments described herein may be implemented in code using any suitable programming language type such as, e.g., assembly code, C, C# or C++ using, e.g., conventional or object-oriented programming techniques. Such code is stored or held on any type of suitable non-transitory computer-readable medium or media such as, e.g., a magnetic or optical storage medium.

As used herein, a "processor," "processing unit," "computer" or "computer system" may be, e.g., a wireless or wire line variety of a microcomputer, minicomputer, server, mainframe, laptop, personal data assistant (PDA), wireless e-mail device (e.g., "BlackBerry," "Android" or "Apple," trade-designated devices), cellular phone, pager, processor, fax machine, scanner, or any other programmable device. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 14:
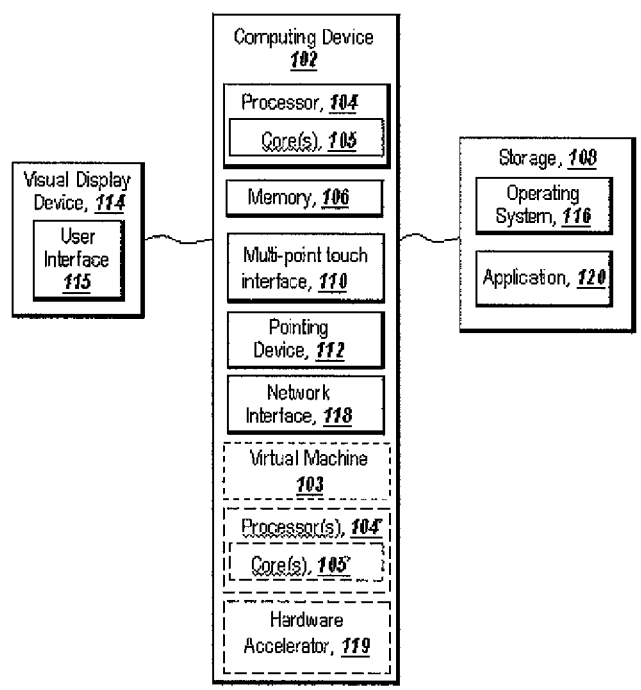
FIG. 14 depicts an exemplary computing environment according to the present disclosure.

Referring now to FIG. 14, an exemplary computing environment suitable for practicing exemplary embodiments is depicted. The environment may include a computing device 102 which includes one or more media for storing one or more computer-executable instructions or code for implementing exemplary embodiments. For example, memory 106 included in the computing device 102 may store computer-executable instructions or software, e.g., processing application 120.

The computing device 102 also typically includes processor 104 and/or one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using one computing resource rather than multiple. Multiple virtual machines can also be used with one processor. Other computing resources, such as field-programmable gate arrays (FPGA), application specific integrated circuit (ASIC), digital signal processor (DSP), graphics processing unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may include a computer system memory or random access memory, such as DRAM, SRAM, EDO RAM, or the like. The memory 106 may include other types of memory as well, or combinations thereof. A user may interact with the computing device 102 through a visual display device 114, such as a display of a mobile device, which may display one or more user interfaces 115. The visual display device 114 may also display other aspects or elements of exemplary embodiments, e.g., adjusted measurement values for a particle characteristic. The computing device 102 may include other I/O devices, such as a multiple-point touch interface 110 and a pointing device 112 for receiving input from a user. The multiple-point touch interface 110 and the pointing device 112 may be operatively associated with or integral with the visual display device 114. The computing device 102 may include other suitable I/O peripherals. The computing device 102 may further include a storage device 108, such as a hard-drive, CD-ROM, or other storage medium for storing an operating system 116 and other programs, e.g., a program 120 including computer executable instructions for modeling deformation characteristics of a material and for generating a virtual representation of a physical interaction with the material.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may include a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system, such as a workstation, desktop computer, server, laptop, handheld computer or other form of computing or telecommunications device that is capable of communication and that has access to sufficient processor power and memory capacity to perform the operations described herein.

The computing device 102 can run any operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Although the teachings herein have been described with reference to exemplary embodiments and implementations thereof, the disclosed apparatus, systems and methods are not limited to such exemplary embodiments/implementations. Rather, as will be readily apparent to persons skilled in the art from the description taught herein, the disclosed apparatus, systems and methods are susceptible to modifications, alterations and enhancements without departing from the spirit or scope hereof. Accordingly, all such modifications, alterations and enhancements within the scope hereof are encompassed herein.

What is claimed:

1. A mobile computing device comprising:
   a processor configured to generate a virtual representation of a physical interaction with a material selected from a database modeling real-world deformation characteristics of a plurality of materials based on the modeled deformation characteristics of the selected material and data representative of the physical interaction; and
   a touchscreen adapted to (i) display the virtual representation of the material; (ii) receive as input from a user the data representative of the physical interaction, wherein the user inputs the data representative of the physical interaction by interacting with the displayed virtual representation of the material, and (iii) display, in real-time, the virtual representation of the physical interaction with the material.

2. The mobile computing device of claim 1, wherein the touchscreen includes multi-touch capabilities.

3. The mobile computing device of claim 1, wherein the displayed virtual representation of the material is a virtual swatch of the material.

4. The mobile computing device of claim 3, wherein one or more points of the virtual swatch are fixed points, thereby anchoring the swatch on a display screen.

5. The mobile computing device of claim 1, wherein real-world deformation characteristics of the material are modeled based on an iterative spring-mass model including a network of nodes and springs.

6. The mobile computing device of claim 5, wherein the iterative spring-mass model includes a network of structural springs between adjacent nodes; a network of shearing springs between diagonal nodes; and a network of bending springs between alternating nodes.

7. The mobile computing device of claim 5, wherein characteristics of the network including at least one of (i) natural length of the springs, and (ii) stiffness of the springs, are selected so as to model the deformation characteristics of the material.

8. The mobile computing device of claim 5, wherein the iterative spring-mass model accounts for external forces including at least one of gravity and a buckling force.

9. The mobile computing device of claim 5, wherein the springs are treated as constraints by the processor.

10. The mobile computing device of claim 9, wherein structural and shearing springs are treated as distance preserving constraints between nodes and bending springs are treated as angle preserving constraints between nodes by the processor.

11. The mobile computing device of claim 5, wherein the iterative spring-mass model accounts for a fixed constraint.

12. The mobile computing device of claim 11, wherein the fixed constraint includes a point that does not change during iteration.

13. The mobile computing device of claim 11, wherein the fixed constraint includes a point fixed relative to a user interaction point.

14. The mobile computing device of claim 5, wherein the iterative spring-mass model accounts for a planar constraint.

15. The mobile computing device of claim 5, wherein the nodes correspond to control points of a B-spline surface.

16. The mobile computing device of claim 15, wherein non-uniform knots are used to produce a uniform B-spline surface.

17. The mobile computing device of claim 1, wherein the generating the virtual representation of a physical interaction includes integrating a system of Euler equations.

18. The mobile computing device of claim 1, wherein the generating the virtual representation of a physical interaction includes using Verlet integration to resolve constraints.

19. The mobile computing device of claim 1, wherein the generating the virtual representation of a physical interaction includes collision detection and resolution.

20. The mobile computing device of claim 19, wherein collision detection includes ellipsoidal collision detection and correction with respect a finger-tip interaction with the touchscreen.

21. The mobile computing device of claim 1, wherein the generating the virtual representation of a physical interaction includes correcting self-intersection.

22. The mobile computing device of claim 1, further comprising an orientation sensor for detecting an orientation of the touchscreen relative to a light source, and wherein the generating the virtual representation of a physical interaction includes accounting for a primary lighting direction in resolving one or more of the following elements related to an appearance of the material: (i) a bidirectional texture function (BTF); (ii) a bidirectional reflectance distribution function (BRDF); (iii) texture; (iv) diffuse color; (v) specular color; (vi) a normal map; or (vii) a random noise map.

23. The mobile computing device of claim 1, further comprising a sensor for detecting a user's perspective angle relative to the touchscreen, and wherein the generating the virtual representation of a physical interaction includes accounting for the user's perspective angle relative to the touchscreen in resolving one or more of the following elements related to an appearance of the material: (i) a bidirectional texture function (BTF); (ii) a bidirectional reflectance distribution function (BRDF); (iii) texture; (iv) diffuse color (v) specular color; (vi) a normal map; or (vii) a random noise map.

24. A simulation system, comprising:
   a database modeling real-world deformation characteristics of a material for each of a plurality of materials;
   a selection interface adapted for receiving as input from a user a selection of a first material from the plurality of materials;
   a tactile interface for receiving as input from a user data representative of a physical interaction with the first material; and
   a display for displaying a virtual representation of the physical interaction with the first material.

25. A method for facilitating evaluating a material for an application, the method comprising:
   providing a database modeling real-world deformation characteristics of a material for each of a plurality of materials;
   using a selection interface to select a first material from the plurality of materials for evaluation thereof;
   using a tactile interface to input data representative of a physical interaction with the first material;
   displaying a virtual representation of the physical interaction with the first material; and
   evaluating the first material for an application based on the displayed virtual representation of the physical interaction.

* * * * *